(12) United States Patent
Minagawa

(10) Patent No.: US 9,469,736 B2
(45) Date of Patent: *Oct. 18, 2016

(54) SURFACE-MODIFYING METHOD AND ELASTIC BODY WITH MODIFIED SURFACE

(75) Inventor: Yasuhisa Minagawa, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 25 days.

This patent is subject to a terminal disclaimer.

(21) Appl. No.: 14/118,136

(22) PCT Filed: May 31, 2012

(86) PCT No.: PCT/JP2012/064030
§ 371 (c)(1),
(2), (4) Date: Nov. 15, 2013

(87) PCT Pub. No.: WO2012/165525
PCT Pub. Date: Dec. 6, 2012

(65) Prior Publication Data
US 2014/0128493 A1 May 8, 2014

(30) Foreign Application Priority Data

Jun. 3, 2011 (JP) ................................. 2011-125450
Sep. 22, 2011 (JP) ................................. 2011-207880
Oct. 3, 2011 (JP) ................................. 2011-219395
Dec. 27, 2011 (JP) ................................. 2011-286278

(51) Int. Cl.
| | | |
|---|---|---|
| C08J 3/28 | (2006.01) | |
| C08F 2/50 | (2006.01) | |
| F16J 15/56 | (2006.01) | |
| C08F 291/02 | (2006.01) | |
| F16J 15/32 | (2016.01) | |
| C08J 7/18 | (2006.01) | |
| A63C 5/056 | (2006.01) | |
| B60C 1/00 | (2006.01) | |
| B60C 11/13 | (2006.01) | |

(52) U.S. Cl.
CPC .................. C08J 7/18 (2013.01); A63C 5/056 (2013.01); B60C 1/0016 (2013.04); B60C 11/1346 (2013.04); C08F 291/02 (2013.01); F16J 15/3284 (2013.01); F16J 15/56 (2013.01)

(58) Field of Classification Search
CPC ...... C08F 2/50; C08F 255/10; C08F 279/02; C08F 291/18; C08J 7/16; C08J 2300/26; C08J 2433/02; C08J 2433/14; B60C 1/0016; B60C 11/0306; B60C 11/1307; B60C 11/3046; B60C 11/1353; B60C 2011/0369; A61L 29/042; A61L 29/14; A61L 2400/018
See application file for complete search history.

(56) References Cited

U.S. PATENT DOCUMENTS

| | | |
|---|---|---|
| 3,418,066 A | 12/1968 | Caldwell et al. |
| 5,100,689 A | 3/1992 | Goldberg et al. |
| 5,340,879 A | 8/1994 | Audenaert et al. |
| 5,637,460 A | 6/1997 | Swan et al. |
| 5,885,566 A | 3/1999 | Goldberg |
| 5,967,714 A * | 10/1999 | Ottersbach et al. ....... 428/424.2 |
| 6,001,894 A * | 12/1999 | Ottersbach et al. .......... 522/149 |
| 6,203,856 B1 | 3/2001 | Ottersbach et al. |
| 6,358,557 B1 | 3/2002 | Wang et al. |
| 6,808,738 B2 * | 10/2004 | DiCosmo et al. ........... 427/2.24 |
| 7,348,055 B2 | 3/2008 | Chappa et al. |
| 8,840,927 B2 | 9/2014 | DiTizio et al. |
| 2002/0161065 A1 | 10/2002 | DiTizio et al. |
| 2004/0086568 A1 | 5/2004 | Ditizio et al. |
| 2004/0106732 A1 | 6/2004 | Tsuji et al. |
| 2007/0003592 A1 | 1/2007 | Hissink |
| 2007/0116971 A1 | 5/2007 | Yoshikawa et al. |
| 2008/0016644 A1 | 1/2008 | Mizote et al. |
| 2008/0312377 A1 | 12/2008 | Schmidt et al. |
| 2011/0160357 A1* | 6/2011 | Gerster et al. .................. 524/83 |
| 2013/0203883 A1* | 8/2013 | Minagawa ...................... 522/35 |
| 2013/0274367 A1 | 10/2013 | Minagawa et al. |
| 2013/0310772 A1* | 11/2013 | Minagawa ..................... 604/265 |
| 2014/0039084 A1* | 2/2014 | Minagawa ...................... 522/46 |
| 2014/0128493 A1* | 5/2014 | Minagawa ...................... 522/35 |
| 2015/0203612 A1 | 7/2015 | Minagawa |

FOREIGN PATENT DOCUMENTS

| | | |
|---|---|---|
| GB | 1120803 A | 7/1968 |
| GB | 1120804 A | 7/1968 |

(Continued)

OTHER PUBLICATIONS

International Search Report issued in PCT/JP2013/074219 dated Dec. 3, 2013.

(Continued)

*Primary Examiner* — Sanza McClendon

(74) *Attorney, Agent, or Firm* — Birch, Stewart, Kolasch & Birch, LLP

(57) ABSTRACT

The present invention aims to provide a method for modifying a surface of a rubber vulcanizate or a thermoplastic elastomer, which can impart excellent sliding properties and excellent durability against repeated sliding motion, and allow the surface to maintain the sealing properties, without using expensive self-lubricating resins. The present invention relates to a method for modifying a surface of an object of a rubber vulcanizate or a thermoplastic elastomer, the method including: Step 1 of forming polymerization initiation points on the surface of the object; and Step 2 of radical-polymerizing a monomer starting from the polymerization initiation points to grow polymer chains on the surface of the object.

19 Claims, 4 Drawing Sheets

(56) References Cited

FOREIGN PATENT DOCUMENTS

| | | |
|---|---|---|
| JP | 61-209667 A | 9/1986 |
| JP | 62-87163 A | 4/1987 |
| JP | 63-92658 A | 4/1988 |
| JP | 5-179055 A | 7/1993 |
| JP | 6-25450 A | 2/1994 |
| JP | 8-1793 A | 1/1996 |
| JP | 9-67457 A | 3/1997 |
| JP | 10-251350 A | 9/1998 |
| JP | 10-298320 A | 11/1998 |
| JP | 2001-95621 A | 4/2001 |
| JP | 2002-145971 A | 5/2002 |
| JP | 2003-2903 A | 1/2003 |
| JP | 2003-510378 A | 3/2003 |
| JP | 2004-528418 A | 9/2004 |
| JP | 2004-298220 A | 10/2004 |
| JP | 2005-213516 A | 8/2005 |
| JP | 2007-119563 A | 5/2007 |
| JP | 2007-145884 A | 6/2007 |
| JP | 2009-30074 A | 2/2009 |
| JP | 2009-138169 A | 6/2009 |
| JP | 2010-23710 A | 2/2010 |
| JP | 2010-142537 A | 7/2010 |
| JP | 2010-142573 A | 7/2010 |
| JP | 2010-150349 A | 7/2010 |
| JP | 2011-189562 A | 9/2011 |
| JP | 2011-241190 A | 12/2011 |
| JP | 2012-162646 A | 8/2012 |
| JP | 2013-159629 A | 6/2013 |
| WO | WO 2007/072613 A1 | 6/2007 |
| WO | WO 2011/038483 A1 | 4/2011 |
| WO | WO 2012/091169 A1 | 7/2012 |

OTHER PUBLICATIONS

U.S. Office Action dated Sep. 21, 2015, for U.S. Appl. No. 14/107,746.
English machine translation of JP-10-251350-A, published Sep. 22, 1998.
English machine translation of JP-10-298320-A, published Nov. 10, 1998.
U.S. Notice of Allowance, issued Dec. 26, 2014, for U.S. Appl. No. 13/956,974.
U.S. Office Action (Requirement for Restriction/Election), issued May 9, 2014, for U.S. Appl. No. 13/956,974.
U.S. Office Action, issued Apr. 17, 2015, for U.S. Appl. No. 13/775,451.
U.S. Office Action, issued Aug. 25, 2014, for U.S. Appl. No. 13/956,974.
U.S. Office Action, issued May 8, 2015, for U.S. Appl. No. 13/756,837.
U.S. Office Action, issued Oct. 20, 2014, for U.S. Appl. No. 13/756,837.
Allmer et al., "Surface Modification of Polymers. I. Vapour Phase Photografting with Acrylic Acid", Journal of Polymer Science: Part A: Polymer Chemistry, vol. 26, pp. 2099-2111, 1988.
International Search Report for PCT/JP2012/064030 mailed on Jul. 24, 2012.
Machine generated English translation of JP-2001-95621-A published Apr. 10, 2001.
Machine generated English translation of JP-2005-213516-A published Aug. 11, 2005.
Machine generated English translation of WO-2007/072613-A1 published Jun. 28, 2007.

* cited by examiner (a)          (b)

(a) Comparative Example 2     (b) Example 14

(a)

(b)

Comparative Example 2

Example 15

SURFACE-MODIFYING METHOD AND ELASTIC BODY WITH MODIFIED SURFACE

TECHNICAL FIELD

The present invention relates to a surface modification method. The present invention also relates to a surface-modified elastic body, a gasket for syringes, and a tire each obtained by the method.

BACKGROUND ART

In view of the importance of the sealing performance, elastic bodies (e.g. rubber) are used for parts that slide while maintaining the sealing performance, such as a gasket which is integrated with a plunger of a syringe and forms a seal between the plunger and the barrel. Such elastic bodies, however, have a slight problem in their sliding properties (see Patent Literature 1). Thus, a sliding property improving agent (e.g. silicone oil) is applied to the sliding surface. It is, however, pointed out that silicone oil may have a negative influence on recently marketed bio-preparations. Meanwhile, gaskets to which no sliding property improving agent is applied are poor in the sliding properties. Thus, such a gasket does not allow the plunger to be pushed smoothly but causes it to pulsate during administration. Hence, some problems occur, such as inaccuracy in the injection amount and pain for patients.

A technique of applying a self-lubricating PTFE film is proposed to simultaneously satisfy these conflicting requirements, that is, the sealing properties and the sliding properties (see Patent Literature 2). The film, however, is generally expensive and thus increases the production cost of processed products, limiting its application range. Moreover, reliability concerns exist with the use of PTFE film-coated products in applications where durability against repeated sliding motion is required. Another problem is that as PTFE film are vulnerable to radiation, PTFE film-coated products cannot be sterilized by radiation.

Furthermore, the use in other applications where sliding properties in the presence of water are required can be considered. Specifically, water can be delivered without a loss by reducing the fluid resistance of the inner surface of a pre-filled syringe or of the inner surface of a pipe or tube for delivering water, or by increasing or greatly reducing the contact angle with water. Moreover, drainage of water on wet roads and of snow on snowy roads can be improved by reducing the fluid resistance of the groove surfaces of tires, or by increasing or greatly reducing the contact angle with water. This leads to enhanced hydroplaning performance and grip performance, and therefore better safety. In addition, less sticking of wastes and dusts can be expected by reducing the sliding resistance of the sidewall surfaces of tires or walls of buildings, or by increasing their contact angle with water.

Further advantageous effects can be expected, such as: less pressure loss in delivering water, an aqueous solution or the like through a diaphragm such as diaphragm pumps or valves; easy sliding of skis or snowboards achieved by enhancing the sliding properties of the sliding surfaces thereof; better noticeability of road signs or signboards achieved by enhancing the sliding properties thereof to allow snow to slide easily on the surface; reduction in water drag and thus less sticking of bacteria to the outer peripheries of ships, achieved by reducing the sliding resistance of the outer peripheries or by increasing the contact angle with water; and reduction in water drag of swimsuits by improving the sliding properties of the thread surfaces thereof.

CITATION LIST

Patent Literature

Patent Literature 1: JP 2004-298220 A
Patent Literature 2: JP 2010-142573 A

SUMMARY OF INVENTION

Technical Problem

The present invention aims to solve the above problems and provide a method for modifying a surface of a rubber vulcanizate or a thermoplastic elastomer, which is capable of imparting excellent sliding properties and excellent durability against repeated sliding motion, and allowing the surface to maintain the sealing properties, without using expensive self-lubricating resins. The present invention also aims to provide a method for modifying a surface of a rubber vulcanizate or a thermoplastic elastomer, which is capable of imparting favorable drainage of water on wet roads and of snow on snowy roads to tires to improve the grip performance. The present invention also aims to provide a surface-modified elastic body, a gasket for syringes, and a tire each obtained by the method.

Solution to Problem

The present invention relates a method for modifying a surface of an object of a rubber vulcanizate or a thermoplastic elastomer, the method including: Step 1 of forming polymerization initiation points on the surface of the object; and Step 2 of radical-polymerizing a monomer starting from the polymerization initiation points to grow polymer chains on the surface of the object.

The rubber vulcanizate or the thermoplastic elastomer preferably contains an allylic carbon atom adjacent to a double bond.

The polymerization initiation points are preferably formed through adsorption of a photoinitiator onto the surface of the object. The photoinitiator is preferably a benzophenone compound.

The method preferably further includes irradiating the adsorbed photoinitiator with light so that the photoinitiator chemically bonds to the surface of the object.

The radical polymerization is preferably photo-radical polymerization.

The light is preferably ultraviolet light having a wavelength of 300 to 450 nm.

The method preferably includes inserting an inert gas into a reaction container and a reaction solution during or before the light irradiation, to create an atmosphere replaced with the inert gas.

In the method, the monomer is preferably at least one selected from the group consisting of ionic monomers and zwitterionic monomers.

It is also preferred that the monomer be at least one selected from the group consisting of acrylic acid, methyl acrylate, ethyl acrylate, propyl acrylate, butyl acrylate, isobutyl acrylate, tert-butyl acrylate, methacrylic acid, methyl methacrylate, ethyl methacrylate, propyl methacrylate, butyl methacrylate, isobutyl methacrylate, tert-butyl methacrylate, 3-sulfopropyl methacrylate potassium salt, 2-(methacryloyloxy)ethyltrimethylammonium chloride, and 2-methacryloyloxyethyl phosphorylcholine.

Also, the monomer may suitably be at least one of compounds represented by the following formula:

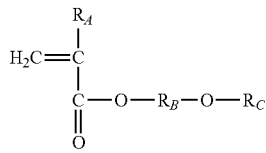

wherein $R_A$ represents a hydrogen atom, a methyl group, an ethyl group, or a propyl group; $R_B$ represents a C1 to C10 alkylene group; and $R_C$ represents a hydrogen atom or a C1 to C10 alkyl group.

In the method, the polymer chains are preferably represented by any of the following formulae (1) to (3):

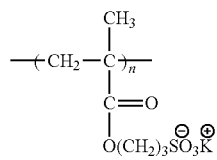
(1)

wherein n is an integer of 1 or greater,

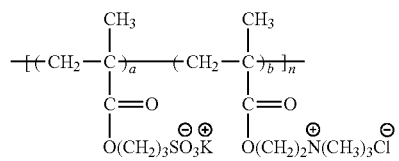
(2)

wherein n is an integer of 1 or greater; and $5 \leq a/b \leq 200$, and

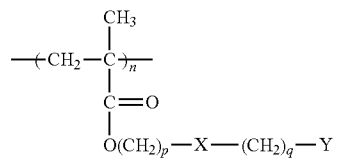
(3)

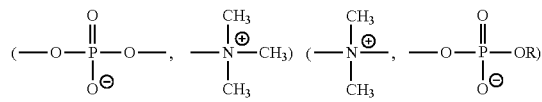

wherein n is an integer of 1 or greater; $p \geq 2$; $q=2,3$, or 4; and R is a hydrocarbon group.

In the method, the monomer is preferably a fluoroalkyl group-containing monomer.

The fluoroalkyl group-containing monomer is preferably at least one selected from the group consisting of 3,3,4,4,5,5,6,6,7,7,8,8,9,9,10,10,11,11,12,12,12-heneicosafluorododecyl acrylate ($H_2C=CHCO_2CH_2CH_2(CF_2)_9CF_3$), 3,3,4,4,5,5,6,6,7,7,8,8,9,9,10,10,10-heptadecafluorodecyl acrylate ($H_2C=CHCO_2CH_2OH_2(CF_2)_7CF_3$), 3-(perfluorobutyl)-2-hydroxypropyl acrylate ($F(CF_2)_4CH_2CH(OH)CH_2OCOCH=CH_2$), 3-perfluorohexyl-2-hydroxypropyl acrylate ($F(CF_2)_6CH_2CH(OH)CH_2OCOCH=CH_2$), 3-(perfluoro-3-methylbutyl)-2-hydroxypropyl acrylate ($(CF_3)_2CF(CF_2)_2CH_2CH(OH)CH_2OCOCH=CH_2$), and 3-(perfluoro-5-methylhexyl)-2-hydroxypropyl acrylate ($(CF_3)_2CF(CF_2)_4CH_2CH(OH)CH_2OCOCH=CH_2$).

It is also preferred that the fluoroalkyl group-containing monomer be a compound represented by the following formula (8), (9), (10), or (11):

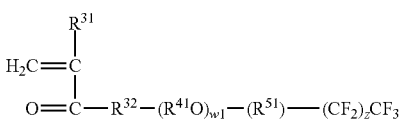
(8)

wherein $R^{31}$ represents hydrogen, a methyl group, an ethyl group, or a propyl group; $R^{32}$ represents —O— or —NH—; $R^{41}$ represents a methylene group, an ethylene group, or a propylene group; $R^{51}$ represents a ketone group, and may or may not be present; w1 represents an integer of 1 to 100; and z represents an integer of 1 to 6,

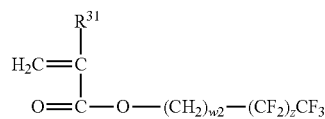
(9)

wherein $R^{31}$ represents hydrogen, a methyl group, an ethyl group, or a propyl group; w2 represents an integer of 4 to 10; and z represents an integer of 1 to 6,

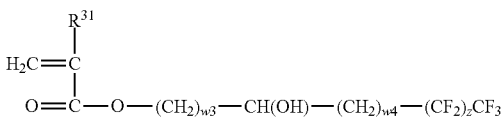
(10)

wherein $R^{31}$ represents hydrogen, a methyl group, an ethyl group, or a propyl group; w3 and w4 each independently represent an integer of 1 to 6; and z represents an integer of 1 to 6, and

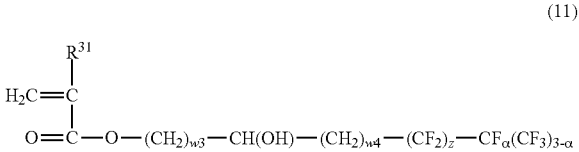
(11)

wherein $R^{31}$ represents hydrogen, a methyl group, an ethyl group, or a propyl group; w3 and w4 each independently represent an integer of 1 to 6; z represents an integer of 1 to 6; and a represents an integer of 1 or 2.

In the method, the photo-radical polymerization preferably includes bringing a (liquid) radical polymerizable monomer or a solution thereof into contact with the surface of the object or the surface of the object to which the photoinitiator is adsorbed or covalently bonded; and irradiating the surface with light to allow polymerization to proceed.

Here, preferably, the (liquid) radical polymerizable monomer or the solution thereof contains a polymerization inhibitor, and the monomer is polymerized in the presence of the polymerization inhibitor. The polymerization inhibitor is preferably 4-methylphenol.

In the method, the polymer chains preferably each have a length of 10 to 50000 nm.

The present invention also relates to a surface-modified elastic body, obtained by the method.

The present invention also relates to a surface-modified elastic body, obtained by the method, the elastic body being required to have sliding properties in the presence of water or in a dry state, low friction, or low water drag.

The present invention also relates to a surface-modified elastic body, including a three-dimensional solid which at least partially has a surface modified by the method.

Here, the surface-elastic body is preferably a polymer brush.

The present invention also relates to a gasket for syringes, at least partially having a surface modified by the method.

The present invention also relates to a tire, at least partially having a groove surface modified by the method.

Advantageous Effects of Invention

Since the surface modification method according to the present invention includes Step 1 of forming polymerization initiation points on a surface of a rubber vulcanizate or a thermoplastic elastomer (an object to be modified); and Step 2 of radical-polymerizing a monomer starting from the polymerization initiation points to grow polymer chains on the surface of the object, the surface of the object can have excellent sliding properties and excellent durability against repeated sliding motion, and also can have favorable sealing properties. Thus, the formation of polymer chains on the surface of the object by the method enables to provide surface-modified elastic bodies (e.g. gaskets for syringes) excellent in these properties. In addition, since the obtained surface-modified elastic bodies do not have a PTFE polymer structure, they can be sterilized by radiation like gamma rays. Moreover, those containing a phospho/phosphate group in their side chain have biocompatibility, and therefore can prevent adsorption and aggregation of proteins in bio-preparations. In addition, forming polymer chains on a groove surface of a tire by the method also improves drainage of water on wet roads and of snow on snowy roads to improve the grip performance of the tire.

DESCRIPTION OF EMBODIMENTS

Figure 1:
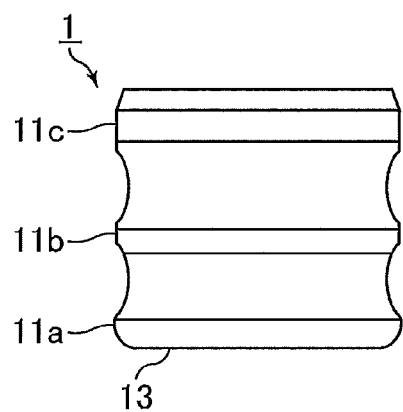
FIG. 1 is a side view of an embodiment of a gasket for syringes.

The present invention relates to a method for modifying a surface of an object of a rubber vulcanizate or a thermoplastic elastomer, including: Step 1 of forming polymerization initiation points on the surface of the object, and Step 2 of radical-polymerizing a monomer starting from the polymerization initiation points to grow polymer chains on the surface of the object.

In Step 1, polymerization initiation points are formed on a surface of a molded rubber vulcanizate or a molded thermoplastic elastomer (object to be modified).

Preferred examples of the rubber vulcanizate and the thermoplastic elastomer include those containing a carbon atom adjacent to a double bond (allylic carbon atom).

Examples of the rubber as the object include diene rubbers such as styrene-butadiene rubber, butadiene rubber, isoprene rubber, natural rubber, and deproteinized natural rubber; and butyl rubber and halogenated butyl rubber which contain isoprene units in an amount of a few percent in terms of the degree of unsaturation. In the case of the butyl rubber or halogenated butyl rubber, rubber crosslinked by triazine is preferred because the amount of matter extracted from the rubber vulcanizate is small. In this case, the rubber may contain an acid acceptor, and examples of suitable acid acceptors include hydrotalcites and magnesium carbonate.

Sulfur vulcanization is preferred for other rubbers. In the case of other rubbers, compounding agents commonly used for sulfur vulcanization may be added, such as vulcanization accelerators, zinc oxide, fillers, and silane coupling agents. Preferred examples of the fillers include carbon black, silica, clay, talc, and calcium carbonate.

The vulcanization conditions for rubber may be appropriately set. The vulcanization temperature for rubber is preferably 150° C. or higher, more preferably 170° C. or higher, and further preferably 175° C. or higher.

Examples of the thermoplastic elastomer include polymer compounds having rubber elasticity at normal temperature owing to the aggregates of plastic components (hard segments) that serve as crosslinking points (e.g. thermoplastic elastomers (TPE), such as styrene-butadiene-styrene copolymers); and polymer compounds having rubber elasticity, obtained by mixing a thermoplastic component and a rubber component and dynamically crosslinking the mixture using a crosslinking agent (e.g. thermoplastic elastomers (TPV), such as polymer alloys, containing a styrene block copolymer or olefinic resin together with a crosslinked rubber component).

Other suitable examples of the thermoplastic elastomer include nylon, polyester, urethane, polypropylene, and dynamically crosslinked thermoplastic elastomers thereof. In the case of using dynamically crosslinked thermoplastic elastomers, preferred examples thereof include those obtained by dynamically crosslinking halogenated butyl rubber in a thermoplastic elastomer. Here, the thermoplastic elastomer may preferably be nylon, urethane, polypropylene, or SIBS (styrene-isobutylene-styrene block copolymer), for example.

Polymerization initiation points can be formed, for example, through adsorption of a polymerization initiator onto a surface of the object. Examples of the polymerization initiator include carbonyl compounds, organic sulfur compounds (e.g. tetraethylthiuram disulfide), persulfides, redox compounds, azo compounds, diazo compounds, halogen compounds, and photoreductive pigments. Preferred among these are carbonyl compounds.

The carbonyl compound as the polymerization initiator is preferably benzophenone or its derivative, and suitable examples thereof include benzophenone compounds represented by the following formula (4):

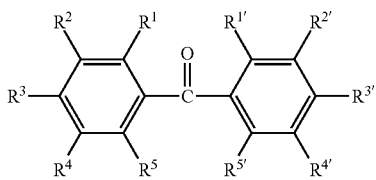

(4)

wherein $R^1$ to $R^5$ and $R^{1'}$ to $R^{5'}$ are the same as or different from one another and each represent a hydrogen atom, an alkyl group, a halogen (fluorine, chlorine, bromine, or iodine), a hydroxyl group, a primary, secondary or tertiary amino group, a mercapto group, or a hydrocarbon group that may contain an oxygen atom, a nitrogen atom or a sulfur atom; and any two adjacent groups thereof may be joined to each other to form a cyclic structure together with the carbon atoms to which they are bonded.

Specific examples of the benzophenone compounds include benzophenone, xanthone, 9-fluorenone, 2,4-dichlorobenzophenone, methyl o-benzoylbenzoate, 4,4'-bis(dimethylamino)benzophenone, and 4,4'-bis(diethylamino)benzophenone. Particularly preferred among these are benzophenone, xanthone, and 9-fluorenone because they contribute to achievement of favorable polymer brushes.

The adsorption of a photoinitiator (e.g. benzophenone compounds) onto the surface of the object may be carried out in accordance with a known method. In the case of using a benzophenone compound, for example, the benzophenone compound is dissolved in an organic solvent to prepare a solution; a surface portion of the object is treated with this solution so that the compound is adsorbed onto the surface portion; and, if necessary, the organic solvent is dried to be evaporated off, whereby polymerization initiation points are formed. The surface-treating method is not particularly limited as long as the solution of the benzophenone compound can be brought into contact with the surface of the object. Suitable examples of the method include application of the benzophenone solution, spraying thereof, and immersion of the surface into the solution. If only a part of the surface needs to be modified, adsorption of a sensitizer only onto the part is enough. In this case, for example, application of the solution or spraying of the solution is suitable. Examples of the solvent include methanol, ethanol, acetone, benzene, toluene, methyl ethyl ketone, ethyl acetate, and THF. Acetone is preferred because it does not swell the object and it is rapidly dried and evaporated off.

Preferably, after a region to be modified is surface-treated with the benzophenone compound solution so that the photoinitiator is adsorbed, the photoinitiator is further irradiated with light so that it chemically bonds to the surface of the object. For example, the benzophenone compound solution can be fixed on the surface by irradiation with ultraviolet light having a wavelength of 300 to 450 nm (preferably 300 to 400 nm, more preferably 350 to 400 nm). During the Step 1 and the fixing, hydrogen is abstracted from the rubber surface, and a carbon atom on the rubber surface is covalently bonded to the carbon atom in C=O of benzophenone, and simultaneously the abstracted hydrogen is bonded to the oxygen atom in C=O to form C—O—H. Moreover, since the hydrogen abstraction reaction selectively occurs on allylic hydrogen atoms in the object, the rubber preferably contains a butadiene or isoprene unit that contains an allylic hydrogen atom.

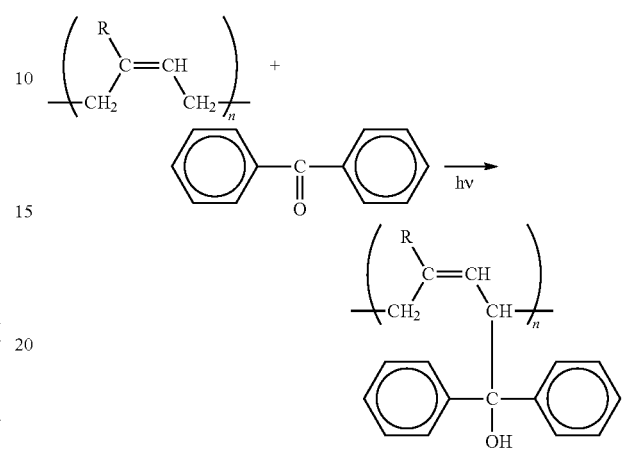

R: hydrogen or a C1 to C4 alkyl group

In Step 2, a monomer is radical-polymerized starting from the polymerization initiation points formed in Step 1 to grow polymer chains on the surface of the object.

The monomer may be one containing a polymerizable unsaturated bond such as a vinyl group, one containing a substituent or side chain in addition to such an unsaturated bond, or an ionic monomer containing an ionic group as a substituent, side chain, or the like. Examples of the ionic monomer include monomers having a positive charge (cationic monomers), such as ammonium and phosphonium; and monomers containing an acidic group which has a negative charge or can be dissociated into a negative charge (e.g. a sulfonate group, a carboxyl group, a phosphate group, a phosphonate group) (anionic monomers).

Specific examples of the ionic monomers include acrylic acid, methacrylic acid, itaconic acid, 3-vinylpropionic acid, vinylsulfonic acid, 2-sulfoethyl (meth)acrylate, 3-sulfopropyl (meth)acrylate, 2-acrylamide-2-methylpropane sulfonic acid, styrenesulfonic acid, and alkali metal salts and amine salts thereof; allylamine, 2-dimethylaminoethyl (meth)acrylate, and hydrohalide salts thereof; 3-trimethylammoniumpropyl (meth)acrylate, and 3-trimethylammoniumpropyl (meth)acrylamide, N,N,N-trimethyl-N-(2-hydroxy-3-methacryloyloxypropyl)ammonium chloride, and 2-(methacryloyloxy)ethyltrimethylammonium chloride.

Examples of the monomer also include the following compounds:

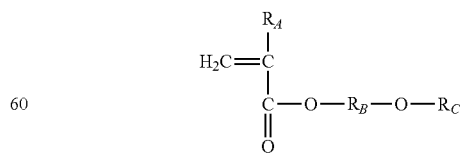

wherein the $R_A$ represents a hydrogen atom, a methyl group, an ethyl group, or a propyl group; and $R_B$ represents a C1 to C10 alkylene group; and $R_C$ represents a hydrogen atom or C1 to C10 alkyl group.

Examples of the alkylene group represented as $R_B$ include a methylene group, an ethylene group, a propylene group, and a butylene group. Examples of the alkyl group represented as $R_C$ include a methyl group, an ethyl group, a propyl group, and a butyl group.

Specific examples of the compound represented by the formula include alkoxyalkyl (meth)acrylate esters such as 2-methoxyethyl (meth)acrylate, 2-methoxypropyl (meth)acrylate, 3-methoxypropyl (meth)acrylate, 2-methoxybutyl (meth)acrylate, 4-methoxybutyl (meth)acrylate, 2-ethoxyethyl (meth)acrylate, 3-ethoxypropyl (meth)acrylate, and 4-ethoxybutyl (meth)acrylate.

The monomer may be a zwitterionic monomer (a zwitterionic group-containing compound: a compound having a center of permanent positive charge and a center of negative charge) such as carboxybetaine, sulfobetaine, and phosphobetaine. To obtain excellent sliding properties and durability, and to maintain favorable sealing properties, the zwitterionic monomer may be a compound represented by formula (5) below, and especially suitably a compound represented by formula (6) below.

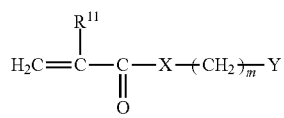

(5)

In the formula, $R^{11}$ represents —H or —$CH_3$; X represents —O— or NH—; and m represents an integer of 1 or greater, and Y represents a zwitterionic group.

Preferably, in the formula (5), $R^{11}$ is —$CH_3$, X is —O—, and m is 1 to 10. Examples of the cation in the zwitterionic group represented by Y include quaternary ammoniums such as tetraalkyl ammonium. Examples of the anion include carboxylate, sulfonate, and phosphate.

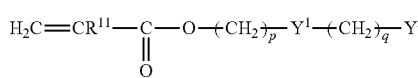

(6)

In the formula, $R^{11}$ represents —H or —$CH_3$; p and q each represent an integer of 1 or greater; and $Y^1$ and $Y^2$ are ionic functional groups having opposite charges.

In the formula (6), p is preferably an integer of 2 or greater, and more preferably an integer of 2 to 10; q is preferably an integer of 1 to 10, and more preferably an integer of 2 to 4. The preferred $R^{11}$ is the same as above. Examples of $Y^1$ and $Y^2$ include the cations and anions described above.

Suitable representative examples of the zwitterionic monomer include compounds represented by the following formulae (6-1) to (6-4):

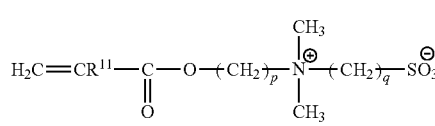

(6-1)

wherein $R^{11}$ represents a hydrogen atom or a methyl group; and p and q each represent an integer of 1 to 10,

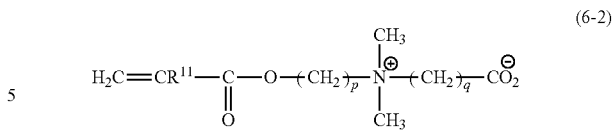

(6-2)

wherein $R^{11}$ represents a hydrogen atom or a methyl group; and p and q each represent an integer of 1 to 10,

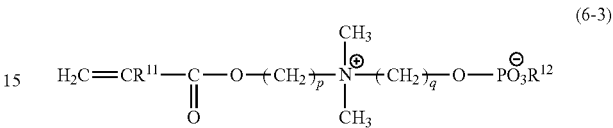

(6-3)

wherein $R^{11}$ represents a hydrogen atom or a methyl group; $R^{12}$ represents a C1 to C6 hydrocarbon group; and p and q each represent an integer of 1 to 10, and

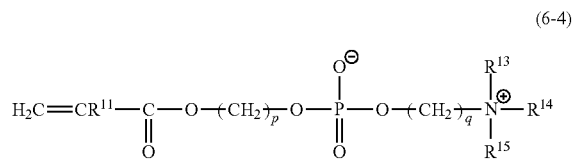

(6-4)

wherein $R^{11}$ represents a hydrogen atom or a methyl group; $R^{13}$, $R^{14}$, and $R^{15}$ are the same as or different from each other and each represent a C1 to C2 hydrocarbon group; and p and q each represent an integer of 1 to 10.

Examples of the compound represented by the formula (6-1) include dimethyl(3-sulfopropyl)(2-(meth)acryloyloxyethyl) ammonium betaine; examples of the compound represented by the formula (6-2) include dimethyl(2-carboxyethyl)(2-(meth)acryloyloxyethyl)ammonium betaine; examples of the compound represented by the formula (6-3) include dimethyl(3-methoxyphosphopropyl)((2-(meth)acryloyloxyethyl) ammonium betaine; and examples of the compound represented by the formula (6-4) include 2-(meth)acryloyloxyethyl phosphorylcholine.

Specific examples of the monomer containing a polymerizable unsaturated bond (e.g. vinyl group) and the monomer containing a substituent group or side chain in addition to the unsaturated bond include methyl acrylate, ethyl acrylate, propyl acrylate, butyl acrylate, isobutyl acrylate, tert-butyl acrylate, methyl methacrylate, ethyl methacrylate, propyl methacrylate, butyl methacrylate, isobutyl methacrylate, and tert-butyl methacrylate.

Particularly preferred among the monomers is 2-(meth)acryloyloxyethyl phosphorylcholine in terms of biocompatibility.

In Step 2, other examples of the monomer containing a polymerizable unsaturated bond include fluoroalkyl group-containing monomers. Any fluoroalkyl group-containing monomer can be used as long as it has one radical polymerizable group (e.g. vinyl group) and at least one fluoroalkyl group. The fluoroalkyl group herein means an alkyl group having at least one fluorine atom substituted for a hydrogen atom. The fluoroalkyl group is further preferably a C7 to C30 fluoroalkyl group, and particularly preferably a C7 to C30 fluoroalkyl group terminally containing a perfluoroalkyl group.

The amount of the fluorine atom in the fluoroalkyl group-containing monomer is preferably 45% by mass or more, and more preferably 50% by mass or more based on the molecular weight of the monomer.

Compounds represented by A-B (A is a radical polymerizable group; and B is a fluoroalkyl group) are suitably used as the fluoroalkyl group-containing monomer. Examples of such a compound include one represented by the following formula:

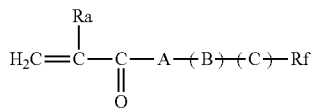

wherein Ra represents a hydrogen atom, a methyl group, an ethyl group, or a propyl group; A represents —O— or —NH—; B represents an optionally substituted alkylene group or an optionally substituted polyoxyalkylene group, and B may or may not be present; C represents a ketone group, and may or may not be present; and Rf represents a fluoroalkyl group that is optionally substituted.

The alkylene group represented by B preferably has 1 to 15 carbon atoms. The polyoxyalkylene group is represented by $(RO)_w$, wherein R preferably has 1 to 10 carbon atoms, and the degree of polymerization w is preferably 1 to 150. The alkylene group and polyoxyalkylene group are optionally substituted. Rf is preferably a C2 to C40 fluoroalkyl group terminally containing a perfluoroalkyl group, and may contain a substituent. The substituent in B and Rf is not particularly limited, and may be a hydroxyl group, for example.

The fluoroalkyl group-containing monomer is preferably a compound represented by formula (7) below because of its ease of polymerization:

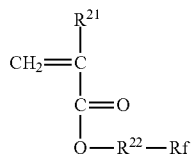

wherein $R^{21}$ represents a hydrogen atom, a methyl group, an ethyl group, or a propyl group; $R^{22}$ represents a C1 to C4 alkylene group; and Rf represents a C7 to C30 fluoroalkyl group terminally containing a perfluoroalkyl group.

$R^{21}$ is preferably a hydrogen atom or a methyl group, and $R^{22}$ is preferably a C1 to C3 alkylene group. Rf is preferably a C7 to C20 fluoroalkyl group terminally containing a perfluoroalkyl group.

Suitable examples of the compound represented by the formula (7) include (meth)acrylate compounds represented by the following formulae (7-1) to (7-3):

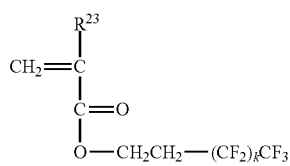

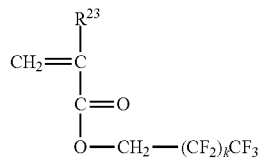

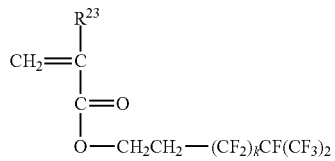

wherein $R^{23}$ represents a hydrogen atom or a methyl group; and k represents 7, 8, 9, 10, 11, or 12.

Specific examples of the fluoroalkyl group-containing monomer include 3,3,4,4,5,5,6,6,7,7,8,8,9,9,10,10,11,11,12,12,12-heneicosafluorododecyl acrylate ($H_2C$=$CHCO_2CH_2CH_2(CF_2)_9CF3$) 3,3,4,4,5,5,6,6,7,7,8,8,9,9,10,10,10-heptadecafluorodecylacrylate ($H_2C$=$CHCO_2CH_2CH_2(CF_2)_7CF_3$), $H_2C$=$CHCO_2CH_2$ $(CF_2)_9CF_3$, $H_2C$=$CHCO_2CH_2$ $(CF_2)_7OF_3$, 3,3,4,4,5,5,6,6,7,7,8,8,9,9,10,10,11,11,12,12,12-heneicosafluorododecyl methacrylate, 3,3,4,4,5,5,6,6,7,7,8,8,9,9,10,10,10-heptadecafluorodecyl methacrylate, 3-(perfluorobutyl)-2-hydroxypropyl acrylate ($F(CF_2)_4CH_2CH(OH)CH_2OCOCH$=$CH_2$) 3-perfluorohexyl-2-hydroxypropyl acrylate ($F(CF_2)_6CH_2CH(OH)CH_2OCOCH$=$CH_2$) 3-(perfluoro-3-methylbutyl)-2-hydroxypropyl acrylate (($CF_3)_2CF$ $(CF_2)_2CH_2CH(OH)CH_2OCOCH$=$CH_2$), and 3-(perfluoro-5-methylhexyl)-2-hydroxypropyl acrylate (($CF_3)_2CF(CF_2)_4CH_2CH(OH)CH_2OCOCH$=$CH_2$). Preferred among these are 3,3,4,4,5,5,6,6,7,7,8,8,9,9,10,10,11,11,12,12,12-heneicosafluorododecyl acrylate ($H_2C$=$CHCO_2CH_2CH_2(CF_2)_9CF_3$), 3,3,4,4,5,5,6,6,7,7,8,8,9,9,10,10,10-heptadecafluorodecyl acrylate ($H_2C$=$CHCO_2CH_2CH_2$ $(CF_2)_7CF_3$) 3,3,4,4,5,5,6,6,7,7,8,8,9,9,10,10,10-heptadecafluorodecyl acrylate ($H_2C$=$CHCO_2CH_2CH_2$ $(CF_2)_7CF_3$) 3-(perfluorobutyl)-2-hydroxypropyl acrylate ($F(CF_2)_4CH_2CH(OH)CH_2OCOCH$=$CH_2$), 3-perfluorohexyl-2-hydroxypropyl acrylate ($F(CF_2)_6CH_2CH(OH)CH_2OCOCH$=$CH_2$), 3-(perfluoro-3-methylbutyl)-2-hydroxypropyl acrylate (($CF_3)_2CF$ $(CF_2)_2CH_2CH(OH)CH_2OCOCH$=$CH_2$) and 3-(perfluoro-5-methylhexyl)-2-hydroxypropyl acrylate (($CF_3)_2CF$ $(CF_2)_4CH_2CH(OH)CH_2OCOCH$=$CH_2$) in terms of high resistance to gamma ray sterilization. Each of these monomers may be used alone or in combination of two or more thereof.

The fluoroalkyl group-containing monomer may be a vinyl monomer having a fluoroalkyl group at a side chain. It is especially preferably a monomer having a fluoroalkyl group at a side chain end and having an oxyalkylene group near its double bond site. Specifically, monomers represented by formula (8) below can be suitably used:

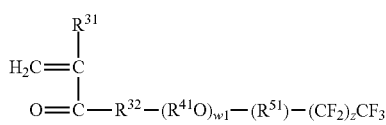

wherein $R^{31}$ represents hydrogen, a methyl group, an ethyl group, or a propyl group; $R^{32}$ represents —O— or —NH—;

$R^{41}$ represents a methylene group, an ethylene group, and a propylene group; $R^{51}$ represents a ketone group, and may or may not be present; w1 represents an integer of 1 to 100; and z represents an integer of 1 to 6.

Compounds represented by formulae (9), (10), and (11) below can also be suitably used as the fluoroalkyl group-containing monomer:

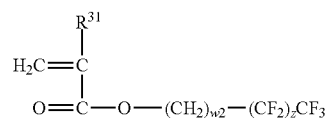

(9)

wherein $R^{31}$ represents hydrogen, a methyl group, an ethyl group, or a propyl group; w2 represents an integer of 4 to 10; and z represents an integer of 1 to 6,

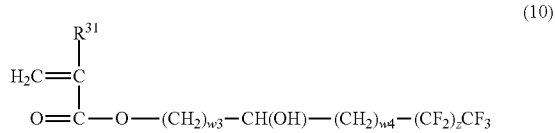

(10)

wherein $R^{31}$ represents hydrogen, a methyl group, an ethyl group, or a propyl group; w3 and w4 each independently represent an integer of 4 to 10; and z represents an integer of 1 to 6,

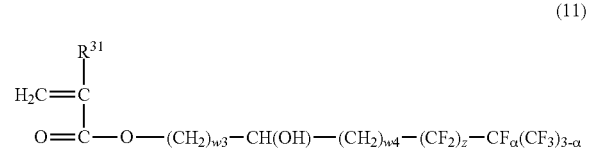

(11)

wherein $R^{31}$ represents hydrogen, a methyl group, an ethyl group, or a propyl group; w3 and w4 each independently represent an integer of 1 to 6; z represents an integer of 1 to 6; and a represents an integer of 1 or 2.

A structure with high molecular mobility (e.g. $(R^{41}O)_{w1}$, $(CH_2)_{w2}$) is preferably located between the fluoroacrylic group of $(CF_2)_zCF_3$ and $CH_2=CR^{31}$ which serves as a main chain after polymerization, so as to facilitate localization of the $(CF_2)_zCF_3$ group or $CF_3$ group on the surface in a dry state to improve the sliding properties.

The method of radical-polymerizing a monomer is not particularly limited, and conventionally known methods can be used. For example, a (liquid) radical polymerizable monomer or a solution thereof is applied (sprayed) to the surface of the object to which a benzophenone compound or the like is adsorbed or covalently bonded, or alternatively the object is immersed in a (liquid) radical polymerizable monomer or a solution thereof. Then, the object is irradiated with ultraviolet light so that radical polymerization (photo-radical polymerization) of the monomer proceeds, whereby polymer chains are grown on the surface of the object. Alternatively, after the application of the monomer or a solution thereof, the surface of the object may be covered with transparent glass, PET, polycarbonate, or the like, and then irradiated with light such as ultraviolet light through the glass or the like so that radical polymerization (photo-radical polymerization) of the monomer proceeds, whereby polymer chains are grown on the surface of the object.

Conventionally known materials and methods may be employed for the solvent to be applied (sprayed), the method of application (spraying), the method of immersion, the conditions for irradiation, and the like. The solution of a radical polymerizable monomer may be an aqueous solution or a solution prepared by dissolving the monomer in an organic solvent that does not dissolve a polymerization initiator (e.g. benzophenone compound) to be used. Furthermore, the (liquid) radical polymerizable monomer or a solution thereof may contain a known polymerization inhibitor such as 4-methylphenol.

In the present invention, radical polymerization is allowed to proceed by light energy irradiation after the (liquid) monomer or a solution thereof is applied to the object, or after the object is immersed in the (liquid) monomer or a solution thereof. Preferred examples of the light source include UV irradiation light sources with an emission wavelength mainly in the ultraviolet region, such as high-pressure mercury lamps, metal halide lamps, or LED lamps. The light dose may be appropriately adjusted in consideration of the polymerization time and uniform progress of the reaction. In order to prevent polymerization inhibition due to active gas like oxygen in a reaction container, preferably oxygen is removed from the reaction container and the reaction solution during or before the light irradiation. For example, some methods may appropriately be employed in which an inert gas like nitrogen gas or argon gas is inserted into the reaction container and the reaction solution to discharge active gas like oxygen from the reaction system so as to replace the atmosphere in the reaction system with the inert gas. Moreover, in order to prevent reaction inhibition due to oxygen or the like, for example, some measures may appropriately be employed in which a ultraviolet light source is placed in such a position that no air layer (oxygen content: 15% or higher) exists between the reaction container made of glass, plastics or the like and the reaction solution or the object.

For ultraviolet light irradiation, the ultraviolet light preferably has a wavelength of 300 to 450 nm, more preferably a wavelength of 300 to 400 nm. This arrangement enables to favorably form polymer chains on the surface of the object. Ultraviolet light having a wavelength below 300 nm disadvantageously polymerizes the monomer alone, not starting from the surface, to form free polymers. Examples of the light source include high pressure mercury lamps, LEDs with a center wavelength of 365 nm, and LEDs with a center wavelength of 375 nm. In particular, for example, LEDs with a center wavelength of 365 nm, which is close to the excitation wavelength (366 nm) of benzophenone, are preferred in terms of efficiency.

For excellent sliding properties and durability and maintenance of favorable sealing properties, the polymer chains formed in the Step 2 are preferably represented by any of the following formulae (1), (2), and (3):

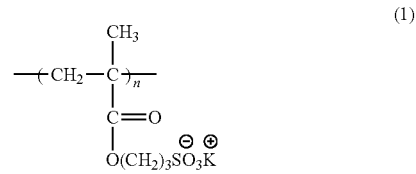

(1)

wherein n is an integer of 1 or greater,

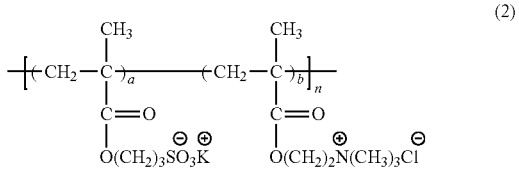

(2)

wherein n is an integer of 1 or greater; and $5 \leq a/b \leq 200$, and

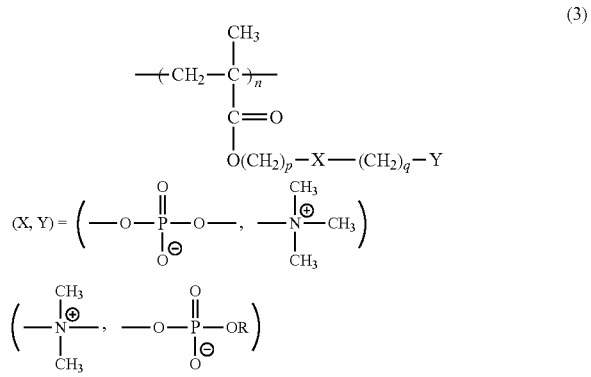

(3)

wherein n is an integer of 1 or greater; $p \geq 2$; $q = 2$, 3, or 4; and R is a hydrocarbon group.

Here, n is preferably 20 to 200000, and more preferably 350 to 50000.

If n is less than 20, the polymer chains tend to be so short that they may be concealed by irregularities on the surface of the object, and therefore tend to fail to impart sliding properties to the surface. If n exceeds 200000, the amount of the monomer used is increased, which tends to lead to an economic disadvantage. Examples of the hydrocarbon group represented as R include a methyl group and an ethyl group.

It is also preferable that the polymer chains formed in the Step 2 be formed by polymerizing the fluoroalkyl group-containing monomer represented by the formula (7). Such polymer chains provide excellent sliding properties and durability and enable maintenance of favorable sealing properties. The degree of polymerization of the polymer chains to be formed is preferably 20 to 200000, and more preferably 350 to 50000.

The polymer chains formed in the Step 2 preferably each have a length of 10 nm to 50000 nm, more preferably 100 to 50000 nm. Polymer chains shorter than 10 nm are unlikely to provide good sliding properties. Polymer chains longer than 50000 nm are unlikely to provide better sliding properties, while they are likely to drive up the cost of raw materials due to the expensive monomer. In addition, surface patterns formed through the surface treatment are likely to be visible to the naked eye, which tends to damage the appearance and to decrease the sealing properties.

In the Step 2, two or more species of monomers may be radical-polymerized starting from the polymerization initiation points. Moreover, multiple kinds of polymer chains may be grown on the surface of the object. The surface modification method may include crosslinking between the polymer chains. In this case, crosslinks via ionic crosslinking or crosslinks via a hydrophilic group containing an oxygen atom may be formed between the polymer chains.

Treatment of a rubber vulcanizate or a thermoplastic elastomer by the surface modification method enables to provide a surface-modified elastic body. The obtained surface-modified elastic body is excellent in the sliding properties in the presence of water or in a dry state, and also excellent in that it has low friction and low water drag. Moreover, treatment of at least a portion of a three-dimensional solid (e.g. elastic body) by the method enables to provide a surface-modified elastic body having better quality. Preferred examples of such a surface-modified elastic body include polymer brushes. The polymer brush herein means an assembly of graft polymer chains obtained by the "grafting from" approach by surface-initiated living radical polymerization. The graft chains are preferably oriented in a direction substantially vertical to the surface of the object because, in such a case, the entropy is reduced and thus the molecular mobility of the graft chains is reduced, which ensures sliding properties. Preferred are semidilute brushes and concentrated brushes which have a brush density of 0.01 chains/nm² or higher.

Furthermore, treatment of a rubber vulcanizate or a thermoplastic elastomer by the surface modification method enables to produce a gasket for syringes which at least partially has a modified surface. The modification is preferably performed at least on the sliding portion of the gasket surface, or may be performed on the entire surface.

FIG. 1 is a side view of an embodiment of the gasket for syringes. A gasket 1 shown in FIG. 1 has three circular protruding portions 11a, 11b and 11c on the outer periphery that comes in contact with the inner periphery of a syringe barrel, each of the protruding portions continuously protruding along the circumferential direction. Examples of the portion of the gasket 1 to be modified include: (1) the surfaces of protruding portions to be in contact with a syringe barrel, such as the circular protruding portions 11a, 11b and 11c; (2) the entire side surface including the circular protruding portions 11a, 11b and 11c; and (3) the entire side surface and a bottom surface 13.

Furthermore, when grooves in the tread of a tire for use on vehicles such as passenger cars are treated by the surface modification method to form a polymer brush on the grooves, the fluid resistance of the groove surface on wet or snowy roads is reduced, and the contact angle with water is increased. Thus, the abilities to remove and drain water or snow are enhanced so that the grip performance can be improved.

Figure 2:
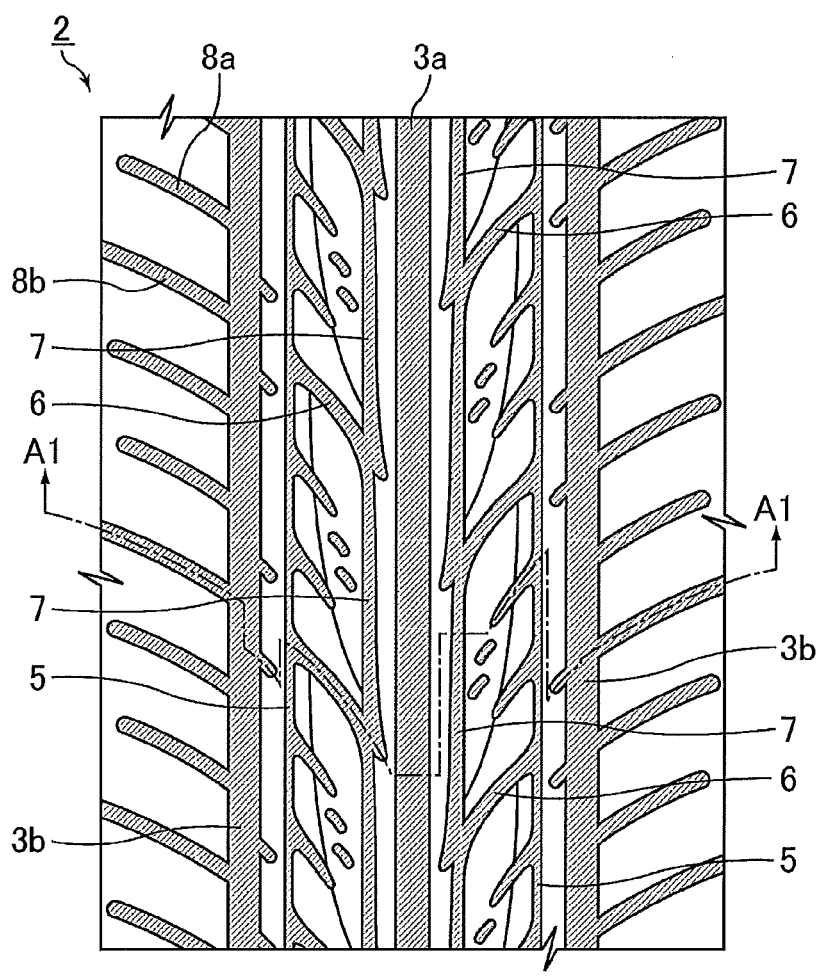
FIG. 2 is a development view of a tread portion of a pneumatic tire (the whole tire is not illustrated).
Figure 3:
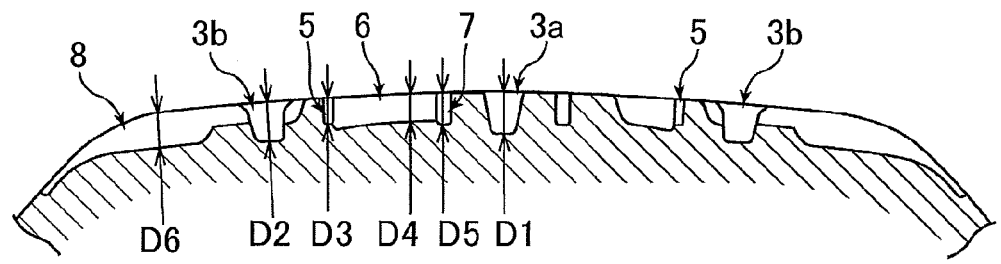
FIG. 3 is a cross-sectional view taken along A1-A1 of FIG. 2.

FIG. 2 is a development view of a tread portion 2 of a pneumatic tire (the whole tire is not illustrated). FIG. 3 is a cross-sectional view taken along A1-A1 of FIG. 2.

In FIGS. 2 and 3, a longitudinal center groove 3a (groove depth D1) and longitudinal shoulder grooves 3b (groove depth D2) are straight grooves straightforwardly extending in the circumferential direction of the tire. Such straight grooves can contribute to low drainage resistance and high drainage performance during straight travelling.

The pneumatic tire also has fine grooves 5 (groove depth D3) extending in the tire circumferential direction on the side of the longitudinal shoulder groove 3b; beveled intermediate grooves 6 (groove depth D4) extending with an inclination from the fine groove 5 toward the longitudinal center groove 3a; connecting grooves 7 (groove depth D5) located inward of the fine grooves 5 in the axis direction of the tire and connecting the beveled intermediate grooves 6 next to one another in the tire circumferential direction; lateral shoulder grooves 8, 8a and 8b (groove depth D6) extending from the longitudinal shoulder groove 3b toward the outside of the tire; and the like, and these grooves can also contribute to drainage performance.

Treatment of these grooves by the method provides the aforementioned effects.

EXAMPLES

The following will describe the present invention in more detail based on, though not limited to, examples.

Example 1

A chlorobutyl rubber (degree of unsaturation: 1% to 2%) containing isoprene units was crosslinked using triazine to give a rubber vulcanizate (vulcanized at 180° C. for 10 minutes). The rubber vulcanizate was immersed in a 1 wt % solution of benzophenone in acetone so that benzophenone was adsorbed onto the surface of the rubber vulcanizate. Then, the rubber vulcanizate was taken out and dried.

The dried rubber vulcanizate was immersed in an aqueous solution of 3-sulfopropyl methacrylate potassium salt in a glass reaction container, and was irradiated with ultraviolet light using an UV lamp (8 W) having a wavelength of 365 nm for 5 hours to perform radical polymerization. Thereby, polymer chains were grown on the rubber surface. In this manner, a surface-modified elastic body (polymer brush) was obtained.

Example 2

A surface-modified elastic body was prepared in the same manner as in Example 1, except that 3-sulfopropyl methacrylate potassium salt was changed to 2-methacryloyloxyethyl phosphorylcholine.

Example 3

A chlorobutyl rubber (degree of unsaturation: 1 to 2%) containing isoprene units was crosslinked using triazine to give a rubber vulcanizate (vulcanized at 180° C. for 10 minutes). The rubber vulcanizate was immersed in a 1 wt % solution of benzophenone in acetone so that benzophenone was adsorbed onto the surface of the rubber vulcanizate. Then, the rubber vulcanizate was dried. Subsequently, the surface of the rubber vulcanizate was irradiated with an UV lamp (8 W) having a wavelength of 365 nm for 30 minutes to allow the benzophenone to chemically bond to the surface. Thereafter, the surface was washed with acetone to remove unreacted benzophenone.

The dried rubber vulcanizate was immersed in an aqueous solution of 3-sulfopropyl methacrylate potassium salt in a glass reaction container, and was irradiated with ultraviolet light using an UV lamp (8 W) having a wavelength of 365 nm for 3.5 hours to perform radical polymerization. Thereby, polymer chains were grown on the rubber surface. In this manner, a surface-modified elastic body was obtained.

Example 4

A surface-modified elastic body was prepared in the same manner as in Example 3, except that 3-sulfopropyl methacrylate potassium salt was changed to 2-(meth)acryloyloxyethyl phosphorylcholine.

Example 5

A surface-modified elastic body was prepared in the same manner as in Example 3, except that the immersion of the dried rubber vulcanizate in an aqueous solution of 3-sulfopropyl methacrylate potassium salt in a glass reaction container was followed by insertion of argon gas into the solution and the container to purge oxygen therefrom for 15 minutes.

Example 6

A surface-modified elastic body was prepared in the same manner as in Example 1, except that the aqueous solution of 3-sulfopropyl methacrylate potassium salt was changed to an aqueous solution prepared by mixing 3-sulfopropylmethacrylate potassium salt and 2-((meth)acryloyloxy)ethyltrimethylammonium chloride at a ratio of 96:4.

Example 7

A surface-modified elastic body was prepared as in the same manner as in Example 1, except that the rubber vulcanizate was irradiated with ultraviolet light for 1.5 hours.

Example 8

A surface-modified elastic body was prepared as in the same manner in Example 1, except that the rubber vulcanizate was irradiated with ultraviolet light for 45 minutes.

Comparative Example 1

A rubber vulcanizate (vulcanized at 180° C. for 10 minutes) prepared by crosslinking chlorobutyl rubber using triazine was used.

Example 9

A chlorobutyl rubber (degree of unsaturation: 1 to 2%) containing isoprene units was crosslinked using triazine to give a rubber vulcanizate (vulcanized at 180° C. for 10 minutes). The rubber vulcanizate was immersed in a solution of benzophenone in acetone (1 wt %) so that benzophenone was adsorbed onto the surface of the rubber vulcanizate. Then, the rubber vulcanizate was taken out and dried.

The dried rubber vulcanizate was immersed in 3,3,4,4,5,5,6,6,7,7,8,8,9,9,10,10,10-heptadecafluorodecyl acrylate in a glass reaction container, and was irradiated with ultraviolet light using an UV lamp (4 W) having a wavelength of 365 nm for 10 hours to perform radical polymerization. Thereby, polymer chains were grown on the rubber surface. In this manner, a surface-modified elastic body (polymer brush) was obtained.

Example 10

A surface-modified elastic body was prepared in the same manner as in Example 9, except that 3,3,4,4,5,5,6,6,7,7,8,8,9,9,10,10,10-heptadecafluorodecyl acrylate was changed to 3,3,4,4,5,5,6,6,7,7,8,8,9,9,10,10,11,11,12,12,12-heneicosafluorododecyl acrylate.

Example 11

A surface-modified elastic body was prepared in the same manner as in Example 9, except that 3,3,4,4,5,5,6,6,7,7,8,8,9,9,10,10,10-heptadecafluorodecyl acrylate contains a polymerization inhibitor.

Example 12

A surface-modified elastic body was prepared in the same manner as in Example 9, except that the rubber vulcanizate was irradiated with ultraviolet light for 6 hours.

Example 13

A chlorobutyl rubber (degree of unsaturation: 1 to 2%) containing isoprene units was crosslinked using triazine to give a rubber vulcanizate (vulcanized at 180° C. for 10 minutes). The rubber vulcanizate was immersed in a solution of benzophenone in acetone (1 wt %) so that benzophenone was adsorbed onto the surface of the rubber vulcanizate. Then, the rubber vulcanizate was taken out and dried. 3,3,4,4,5,5,6,6,7,7,8,8,9,9,10,10,10-Heptadecafluorodecyl acrylate was applied to the surface of the dried rubber vulcanizate. The coated surface was covered with glass, and irradiated with ultraviolet light through the glass using a UV lamp (4 W) having a wavelength of 365 nm for 5 hours to perform radical polymerization. Thereby, polymer chains were grown on the rubber surface to provide a surface-modified elastic body (polymer brush).

Surface-modified elastic bodies prepared in the examples and comparative example were evaluated by the following methods.

(Length of Polymer Chain)

The length of each of the polymer chains formed on the surface of the rubber vulcanizate was measured on a cross section of the modified rubber vulcanizate with polymer chains formed thereon, using an SEM at an accelerating voltage of 15 kV and a magnification of 1000 times. The thickness of a polymer layer measured on photographs was regarded as the length of the polymer chain.

(Contact Angle)

The contact angle of water was measured using FTÅ 125 (a product of First Ten Angstroms, Inc.). Specifically, after a drop of water (2 µL) was placed on the surface of the elastic body, changes in the contact angle with time were measured.

(Coefficient of Static Friction and Coefficient of Dynamic Friction)

The coefficients of static friction and dynamic friction of the surface of the surface-modified elastic body and the coefficients of static friction and dynamic friction of the surface of the sample with 200 µL of water dripped thereon were measured in accordance with methods described in ASTM D1894. Also, the sample was brought into contact with borosilicate glass and the friction with borosilicate glass was measured. The measurement of the coefficients of friction was performed at a load of 200 g, a tensile rate of 600 mm/min, and a load distance of 10 cm. The device used here was HEIDON type 14 (Shinto Scientific Co., Ltd.).

TABLE 1

|  | Examples | | | | | | | | Comparative Example |
|---|---|---|---|---|---|---|---|---|---|
|  | 1 | 2 | 3 | 4 | 5 | 6 | 7 | 8 | 1 |
| Length of polymer chain (nm) | 3800 | 3400 | 2300 | 2100 | 4500 | 3800 | 960 | 600 | — |
| Contact angle (degrees) of water at 30 seconds after placing a drop of water | 56.38° | 58.20° | 49.76° | 54.28° | 38.14° | 60.43° | 59.77° | 60.26° | 81.88° |
| Coefficient of static friction | 0.75 | 0.81 | 0.65 | 0.72 | 0.51 | 0.83 | 0.91 | 0.96 | 2.03 |
| Coefficient of dynamic friction | 0.47 | 0.54 | 0.41 | 0.46 | 0.32 | 0.55 | 0.62 | 0.69 | 1.42 |
| Coefficient of static friction at 30 seconds after placing a drop of water | 0.29 | 0.33 | 0.25 | 0.28 | 0.18 | 0.33 | 0.35 | 0.41 | 1.68 |
| Coefficient of dynamic friction at 30 seconds after placing a drop of water | 0.20 | 0.23 | 0.09 | 0.18 | 0.07 | 0.22 | 0.27 | 0.35 | 1.23 |

As shown in Table 1, the surface-modified elastic bodies prepared in the examples had much smaller contact angle of water and were more hydrophilic than the surface-unmodified rubber vulcanizate of Comparative Example 1.

In addition, in each example, the surface of the surface-modified elastic body had greatly reduced coefficients of static friction and dynamic friction, showing good sliding properties. Since only the surface was modified, the sealing properties were equal to that in Comparative Example 1.

Therefore, a gasket for a syringe plunger formed from the surface-modified elastic body provides sufficient sealing properties while reducing the friction of the plunger with the syringe barrel, which enables easy and accurate operations of the syringe. Moreover, such a gasket has a small difference between the coefficient of static friction and coefficient of dynamic friction, and thereby enables a smooth push and smooth insertion of the plunger without pulsation. Furthermore, a syringe with a syringe barrel that is formed from a thermoplastic elastomer and then treated to form polymer chains on its inner surface is also easy to operate as mentioned above.

Additionally, the effects mentioned earlier can be expected when polymer chains are formed on the surfaces of the grooves in treads and sidewalls of tires for vehicles such as passenger cars, on the surfaces of diaphragms, on the sliding surfaces of skis and snowboards, on the surfaces of swimsuits, road signs, sign boards, and the like.

TABLE 2

|  | Examples | | | | | Comparative Example |
|---|---|---|---|---|---|---|
|  | 9 | 10 | 11 | 12 | 13 | 1 |
| Length of polymer chain (nm) | 15000 | 12000 | 8000 | 10000 | 16000 | — |
| Contact angle (degrees) of water at 30 seconds after placing a drop of water | 102.40° | 105.55° | 101.85° | 100.95° | 104.80° | 81.88° |
| Coefficient of static friction | 0.75 | 0.65 | 0.76 | 0.76 | 0.7 | 2.03 |
| Coefficient of dynamic friction | 0.43 | 0.37 | 0.45 | 0.46 | 0.41 | 1.42 |
| Coefficient of static friction at 30 seconds after placing a drop of water | 0.7 | 0.63 | 0.72 | 0.74 | 0.69 | 1.68 |
| Coefficient of dynamic friction at 30 seconds after placing a drop of water | 0.38 | 0.34 | 0.42 | 0.43 | 0.38 | 1.23 |

As shown in Table 2, the surface-modified elastic bodies prepared in the examples had a larger contact angle of water than the surface-unmodified rubber vulcanizate of Comparative Example 1. Also, the surface-modified elastic bodies of the examples had significantly reduced coefficients of static friction and dynamic friction, providing good sliding properties.

Example 14

SBR (100 parts by mass), carbon black (55 parts by mass), oil (10 parts by mass), zinc oxide (3 parts by mass), and stearic acid (2 parts by mass) were kneaded with a Banbury mixer. Subsequently, sulfur (1.5 parts by mass) and a vulcanization accelerator (1 part by mass) were added to the kneaded product. They were kneaded with a roll mill to provide a compounding rubber. The materials used are listed below.
(Materials Used)
SBR: SBR 1502 (JSR Corp.)
Carbon black: DIABLACK I (Mitsubishi Chemical Corporation)
Oil: X 140 (JX Nippon Oil & Energy Corporation)
Zinc oxide: Zinc oxide #2 (Mitsui Mining & smelting Co., Ltd.)
Stearic acid: Stearic acid beads "TSUBAKI" (NOF Corporation)
Sulfur: Sulfur (200 mesh) (Tsurumi Chemical Industry Co., Ltd.)
Vulcanization accelerator: NOCCELER NS (Ouchi Shinko Chemical Industrial Co., Ltd)

Figure 4:
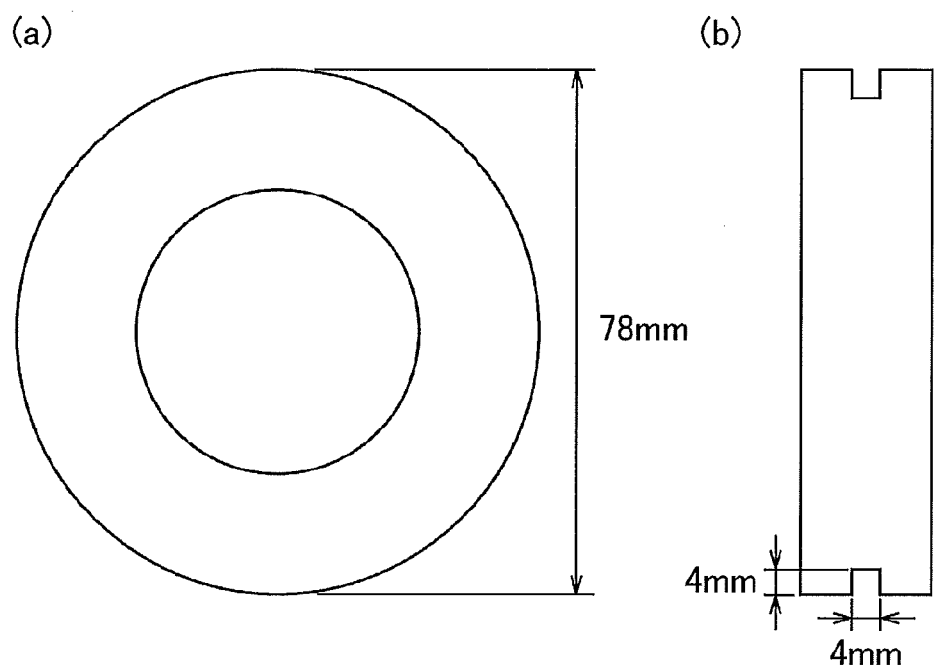
FIG. 4 is a schematic view of a prepared sample having a groove.

The resultant compounding rubber was vulcanized at 170° C. for 25 minutes in a mold for LAT. The surface of the vulcanized rubber was grooved with a grooving tool (electric heat cutter) to provide a grooved sample shown in FIG. 4.

A 3 mass % solution of benzophenone in acetone was applied to the groove and dried. The coating was irradiated with ultraviolet light for 10 minutes using a high pressure mercury lamp so that the benzophenone was fixed. Subsequently, 3,3,4,4,5,5,6,6,7,7,8,8,9,9,10,10,10-heptadecafluorodecyl acrylate in liquid form was applied to the groove, and irradiated with a LED lamp (2 mW/cm$^2$) having a wavelength of 365 nm to perform polymerization for 2 hours. The resultant grooved sample, which had a polymer brush on its surface grown by the surface modification, was washed with water and subjected to an ultrasonic cleaning in water, followed by drying under vacuum.

Example 15

The same steps as in Example 14 were performed until benzophenone was fixed to the surface of the groove. Subsequently, a 2.5 M solution of 3-sulfopropyl methacrylate potassium salt was charged into a glass container, and a small amount of riboflavin was added to the container. The grooved sample was immersed in the aqueous solution, and then was rotated in parallel with irradiation of the groove with light having a wavelength of 365 nm using a LED lamp (2 mW/cm$^2$) to perform polymerization for 6 hours. The resultant grooved sample, which had a polymer brush on its surface grown by the surface modification, was washed with water and subjected to an ultrasonic cleaning in water, followed by drying under vacuum.

Comparative Example 2

A grooved sample (not surface-treated) was prepared in the same manner as in Example 14.

The grooved rubber sample and the grooved sample were evaluated in accordance with the following methods.
(Water Drainage Test)

Figure 5:
FIG. 5 is a photograph of a groove with drops of water in a water drainage test.

Drops of water were placed on the groove, and the test sample was rotated at a rate of 180° per minute. Whether the drops of water ran off the sample was observed. FIG. 5 is a photograph showing the sample used in the test with drops of water on the groove.
(Snow Drainage Test)

Frost was placed on the groove, and the test sample was rotated at a rate of 180° per minute. Whether the frost ran off the sample was observed.

Figure 6:
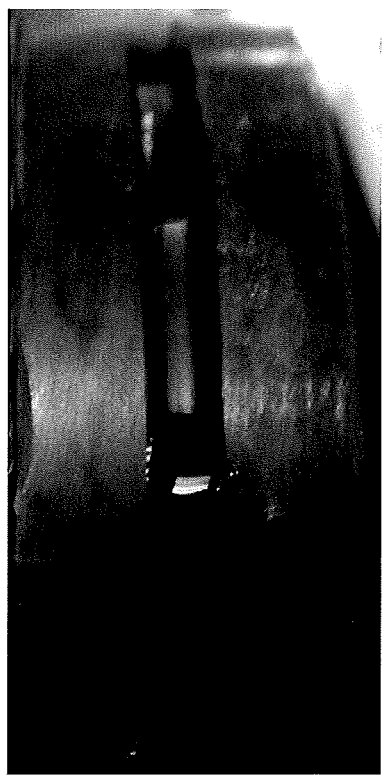
FIG. 6 shows photographs of samples of Comparative Example 2 and Example 14 in a water drainage test.
Figure 6:

In Comparative Example 2, in which a grooved sample (non-treated) was used, the drops of water remained on the sample even after rotating the sample through about 90°, as shown in FIG. 6(a). That is, the sample showed poor water drainage. In contrast, in Example 14, in which a surface-modified grooved rubber sample was used, rotation of the sample through about 75° allowed the drops of water to run off, as shown in FIG. 6(b). That is, favorable water drainage was shown.

Figure 7:
FIG. 7 shows photographs of samples of Comparative Example 2 and Example 15 in a snow drainage test.
Figure 7:

In Comparative Example 2, some of the frost remained even after rotating the sample through about 90°, as shown in FIG. 7(a). In contrast, in Example 15, in which a surface-modified groove rubber sample was used, rotation of the sample through about 75° allowed the frost to slide down (FIG. 7(b)). That is, favorable snow drainage was shown.

The above-described results indicate that the polymer brush formed on the inner surface of the groove improves water drainage and snow drainage, and thereby improves wet grip performance and ice grip performance.

REFERENCE SIGNS LIST

1: Gasket
11a, 11b, 11c: Circular protruding portion
13: Bottom surface
2: Tread portion
3a: Longitudinal center groove
3b: Longitudinal shoulder groove
5: Fine groove
6: Beveled intermediate groove
7: Connecting groove
8, 8a, 8b: Lateral shoulder groove

The invention claimed is:

1. A gasket for syringes, at least partially having a surface modified by a method for modifying a surface of an object of a rubber vulcanizate or a thermoplastic elastomer, the method comprising:
   Step 1 of forming polymerization initiation points on the surface of the object; and
   Step 2 of radical-polymerizing a monomer starting from the polymerization initiation points to grow polymer chains on the surface of the object,
   wherein the rubber vulcanizate or thermoplastic elastomer contains an allylic carbon atom which is a carbon atom adjacent to a double bond.

2. A tire, at least partially having a groove surface modified by a method for modifying a surface of an object of a rubber vulcanizate or a thermoplastic elastomer, the method comprising:
   Step 1 of forming polymerization initiation points on the surface of the object; and
   Step 2 of radical-polymerizing a monomer starting from the polymerization initiation points to grow polymer chains on the surface of the object.

3. The gasket for syringes according to claim 1, wherein the polymerization initiation points are formed through adsorption of a photoinitiator onto the surface of the object.

4. The gasket for syringes according to claim 3, wherein the photoinitiator is a benzophenone compound.

5. The gasket for syringes according to claim 3, wherein the adsorbed photoinitiator is irradiated with light so that the photoinitiator chemically bonds to the surface of the object.

6. The gasket for syringes according to claim 1, wherein the radical polymerization is photo-radical polymerization.

7. The gasket for syringes according to claim 5, wherein the light is ultraviolet light having a wavelength of 300 to 450 nm.

8. The gasket for syringes according to claim 5, wherein an inert gas is inserted into a reaction container and a reaction solution during or before the light irradiation, to create an atmosphere replaced with the inert gas.

9. The gasket for syringes according to claim 1, wherein the monomer is at least one selected from the group consisting of ionic monomers and zwitterionic monomers.

10. The gasket for syringes according to claim 1, wherein the monomer is at least one selected from the group consisting of acrylic acid, methyl acrylate, ethyl acrylate, propyl acrylate, butyl acrylate, isobutyl acrylate, tert-butyl acrylate, methacrylic acid, methyl methacrylate, ethyl methacrylate, propyl methacrylate, butyl methacrylate, isobutyl methacrylate, tert-butyl methacrylate, 3-sulfopropyl methacrylate potassium salt, 2-(methacryloyloxy)ethyltrimethylammonium chloride, and 2-methacryloyloxyethyl phosphorylcholine.

11. The gasket for syringes according to claim 1, wherein the monomer is at least one compound represented by the following formula:

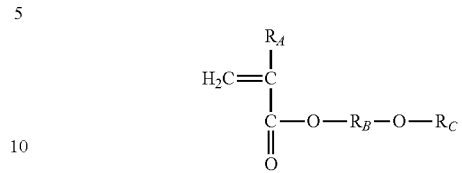

wherein $R_A$ represents a hydrogen atom, a methyl group, an ethyl group, or a propyl group;
$R_B$ represents a C1 to C10 alkylene group; and $R_C$ represents a hydrogen atom or a C1 to C10 alkyl group.

12. The gasket for syringes according to claim 1, wherein the polymer chains are represented by any of the following formulae (1) to (3):

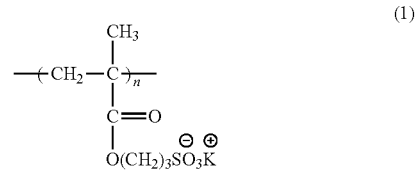

wherein n is an integer of 1 or greater,

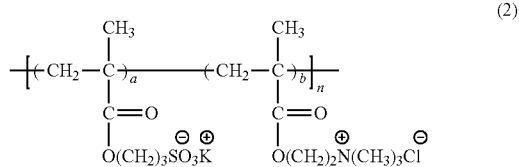

wherein n is an integer of 1 or greater; and 5≤a/b≤200, and

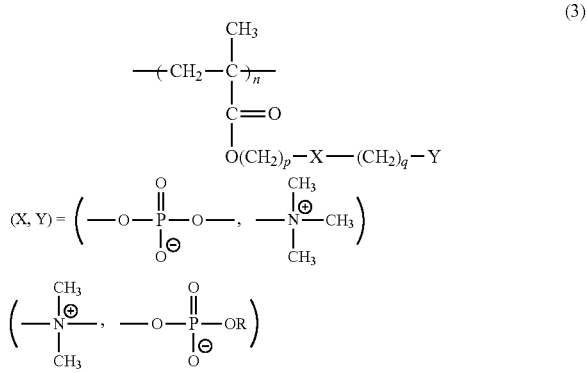

wherein n is an integer of 1 or greater; p≥2; q=2, 3, or 4; and R is a hydrocarbon group.

13. The gasket for syringe according to claim 1, wherein the monomer is a fluoroalkyl group-containing monomer.

14. The gasket for syringes according to claim 12, wherein the fluoroalkyl group-containing monomer is at least one selected from the group consisting of 3,3,4,4,5,5,6,6,7,7,8,8,9,9,10,10,11,11,12,12,12-heneicosafluorododeccyl acrylate (H₂C=CHCO₂CH₂CH₂(CF₂)₉CF₃), 3,3,4,4,5,5,6,6,7,7,8,8,9,9,10,10,10-heptadecafluorodecyl acrylate (H₂C=CHCO₂CH₂CH₂(CF₂)₇CF₃), 3-(perfluorobutyl)-2-hydroxypropyl acrylate (F(CF₂)₄CH₂CH(OH)CH₂OCOCH=CH₂), 3-perfluorohexyl-2-hydroxypropyl acrylate (F(CF₂)₆CH₂CH(OH)CH₂OCOCH=CH₂), 3-(perfluoro-3-methylbutyl)-2-hydroxypropyl acrylate ((CF₃)₂CF(CF₂)₂CH₂CH(OH)CH₂OCOCH=CH₂), and 3-(perfluoro-5-methylhexyl)-2-hydroxypropyl acrylate ((CF₃)₂CF(CF₂)₄CH₂CH(OH)CH₂OCOCH=CH₂).

15. The gasket for syringes according to claim 12, wherein the fluoroalkyl group-containing monomer is a compound represented by the following formula (8), (9), (10), or (11):

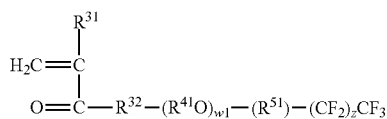
(8)

wherein $R^{31}$ represents hydrogen, a methyl group, an ethyl group, or a propyl group; $R^{32}$ represents —O— or —NH—; $R^{41}$ represents a methylene group, an ethylene group, or a propylene group; $R^{51}$ represents a ketone group, and may or may not be present; w1 represents an integer of 1 to 100; and z represents an integer of 1 to 6,

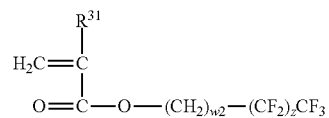
(9)

wherein $R^{31}$ represents hydrogen, a methyl group, an ethyl group, or a propyl group; w2 represents an integer of 4 to 10; and z represents an integer of 1 to 6,

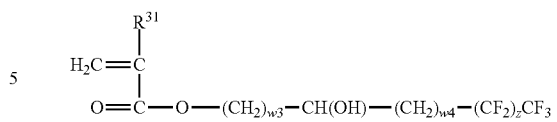
(10)

wherein $R^{31}$ represents hydrogen, a methyl group, an ethyl group, or a propyl group; w3 and w4 each independently represent an integer of 1 to 6; and z represents an integer of 1 to 6, and

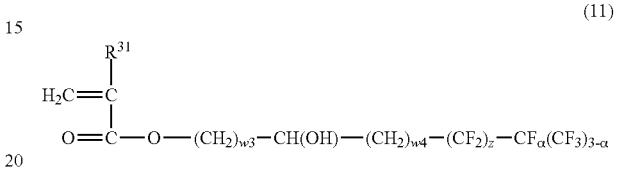
(11)

wherein $R^{31}$ represents hydrogen, a methyl group, an ethyl group, or a propyl group; w3 and w4 each independently represent an integer of 1 to 6; z represents an integer of 1 to 6; and α represents an integer of 1 or 2.

16. The gasket for syringes according to claim 6, wherein the photo-radical polymerization comprises bringing a liquid radical polymerizable monomer or a solution thereof into contact with the surface of the object or the surface of the object to which the photoinitiator is adsorbed or covalently bonded; and irradiating the surface with light to allow polymerization to proceed.

17. The gasket for syringes according to claim 15, wherein the liquid radical polymerizable monomer or the solution thereof contains a polymerization inhibitor, and the monomer is polymerized in the presence of the polymerization inhibitor.

18. The gasket for syringes according to claim 16, wherein the polymerization inhibitor is 4-methylphenol.

19. The gasket for syringes according to claim 1, wherein the polymer chains each have a length of 10 to 50000 nm.

* * * * *